United States Patent Office 3,158,460
Patented Nov. 24, 1964

3,158,460
METHOD AND COMPOSITION FOR INHIBITING THE GERMINATION OF SEEDS
Olav Rosenlund Hansen, 1 Vognborgvej, Copenhagen, Denmark
No Drawing. Filed Dec. 15, 1960, Ser. No. 75,929
Claims priority, application Great Britain, Dec. 23, 1959, 43,733/59
14 Claims. (Cl. 71—2.6)

This invention relates to a method for inhibiting or hampering the germination of seeds in the soil or other substrates and to a composition for use in carrying out the method. More specifically, the invention aims at providing a method of a type hitherto unknown for controlling weeds and other undesired plants in useful plant cultures.

Known herbicides are effective against a larger or smaller number of species of plants and they usually act at all growth stages of the plants sensitive thereto, though in some cases more effectively in the young stages than in older ones. Therefore, such herbicides must either be employed only in cultures of plants which are insensitive to the herbicide in question, or they must be applied before sowing or planting of the useful crops or at least before the seeds of the latter germinate.

In contradistinction hereto, the present method allows controlling the growth of all types of seed-plants, at one stage of their development, being practically ineffective and harmless to the plants at other stages of their life.

According to the invention it has been found that the germination of seeds of plants in a substrate, particularly in the soil, may be inhibited or hampered by treating the soil with o-aminobenzene-sulphonamides substituted with halogen in the 5-position (i.e., 5-halogen-orthanilamides) having the general formula

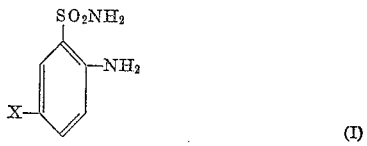

(I)

wherein X denotes a halogen atom. All of the four possible 5-halogen-orthanilamides seem to be equally effective but it is preferred to employ the chlorine or bromine compound because these are cheaper in manufacture than the fluorine or iodine compound.

The said compounds are very sparingly soluble in water. For that reason it is preferred to employ the compounds in the form of water-soluble salts thereof. Most convenient amongst such water-soluble salts are the amine salts and the alkali metal salts, e.g., the triethanolamine salts or sodium salts.

The amount of the compounds in question to employ may vary according to the kinds of seeds, the germination of which is to be inhibited, the degree of moisture in the substrate, and other variables. Generally, it has been found that amounts of from 5 to 50 kgs. of active compound (i.e., exclusive of the salt-forming moiety) will suffice to bring about complete inhibition of the germination of seeds present in the substrate, provided that the conditions for the treatment are satisfactory, i.a., that sufficient amount of water is present in the soil. Preferably, 15–20 kgs. of active compounds are employed per hectare because this amount has been found sufficient to kill at least some 95% of the germinating seeds in the substrate.

By experiments it has been found that the 5-halogen-orthanilamides are adsorbed rather firmly in the substrates, particularly in soil. For this reason it is in many cases necessary or preferable to take care of providing the soil to be treated with large amounts of water in connection with or soon after the treatment; this may be done by applying the compounds, in any suitable formulation, to the soil during rain or by strongly watering the treated soil subsequent to the application of the compounds in question. Under ordinary conditions it is not feasible in practice to provide the necessary amount of water by dissolving the salts of the active compounds in large amounts of water prior to distributing by a suitable spraying apparatus, because the costs involved therein, particularly in providing and transporting the large containers then necessary, thereby become too high. If the substrate to be treated is very moist, no additional watering seems to be necessary when a liquid composition containing the 5-halogen-orthanilamides is employed for carrying out the method.

By laboratory tests and other experiments it has been found that the 5-halogen-orthanilamides are effective during the germination process. Fully developed seedlings and juvenile and more or less developed or mature plants are in most cases not sensitive. Particularly green parts of plants are not harmed by these compounds. Roots may in some cases be harmed by the compounds but in the practical application of the present method this circumstance has no importance, due to the fact that the compounds are adsorbed in the upper layers of the soil where development of roots is inessential or negligible. For this reason, no phytotoxic effects are observed on plants which survive the first couple of days after treatment. Nor are any phytotoxic effect observed on perennials or larger annuals present in the treated area. This type of selectivity, not previously available in commercial herbicides, renders the present compounds useful as a new type of herbicides for use especially in biennial or perennial cultures, though also in annual cultures having passed the first stage after germination.

From the above it will be gathered that the 5-halogen-orthanilamides can be employed as a new type of herbicides, useful particularly in biennial and perennial cultures or in annual cultures of plants having passed their germination stage of growth. In accordance herewith, a particular aspect of the invention consists in killing germinating seeds or seedlings of undesired plants in cultures of useful plants past the germination stage by treating the culture with a 5-halogen-orthanilamide.

The invention also relates to an agent or a composition for carrying out the said method, containing as an active ingredient one or more 5-halogen-orthanilamides having the general formula

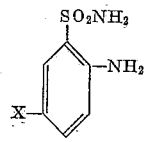

wherein X denotes a halogen atom, together with a diluent or carrier. Preferably, the halogen atom is chlorine or bromine.

In a preferred embodiment the active component of the composition is present in the form of a water-soluble salt thereof, preferably an amine salt such as the triethanolamine salt, or an alkali metal salt such as the sodium salt, the diluent or carrier being water. A dispersing agent may be present in the composition.

Under some circumstances it may be convenient to use the composition in the form of a dry, powdery preparation. In that case, the active component is expediently present in the form of a water-soluble salt, preferably an amine salt or an alkali metal salt, the diluent or carrier being a solid, pulverulent material. A wetting agent and/or a dispersing agent may also be incorporated in the composition. The solid, pulverulent material may be any material known in the art, such as kaolin, diatomaceous earth, or, if desired, an agricultural or horticultural fertilizer. The composition may also contain conventional herbicides and/or fungicides.

Various other aspects of the invention will be apparent from the following description, discussing various tests which have been carried out with the 5-halogen-orthanilamides.

Experiments for comparison of the present compounds and certain compounds known to possess herbicidal and phytotoxic effect were carried out as follows:

Filter-paper (diameter 90 mms.) was placed in the bottom of a Petri dish and was moistened evenly with a solution of the compound to be tested in a suitable formulation (usually a salt, e.g., the triethanolamine salt). If another solvent than water is employed, it is evaporated. A measured amount of seeds of *Poa trivialis*, a common species of grass, was distributed on the filter-paper and if not already moist the latter was moistened with tap-water. Thereafter the dish was kept in darkness at a temperature of 25° C. After seven days the total length of all of the seedlings (only the green parts, i.e., these above the seeds) from the dish was measured and compared with the corresponding length of the seedlings from seeds germinated in similar dishes treated only with water. From the figure so obtained with various amounts of the various compounds, the amount of active component per Petri dish inducing 50 percent inhibition was calculated. A summary of the result is given in Table 1 below.

*Table 1*

| Compound | Mgs. of active component per Petri dish giving 50% inhibition of germination of *Poa trivialis* |
|---|---|
| 2.4-Dichlorophenoxyacetic acid | 0.2 |
| 3-Aminotriazole | 0.2 |
| bis-Chloralurea | 0.2 |
| Bromoacet-di-n-butyramide | 0.25 |
| Dichloroacetic acid | 1 |
| Trichloroacetic acid | 0.25 |
| 2-Amino-5-chlorobenzenesulphonamide | 0.008 |
| 2-Amino-5-bromobenzenesulphonamide | 0.008 |

The table shows that the two compounds of the general Formula I are 25 times as effective in inhibiting the germination of *Poa trivialis* as was the best of the herbicidal compounds tested.

Other trials were carried out to estimate the activity of the compounds of the general Formula I on various weeds. Such screening tests were carried out in the following manner:

The plants to be tested were sown in pots or wooden boxes; the soil in these had immediately prior to the sowing or were soon after the sowing treated with the compound in question in a suitable formulation, usually the salt with triethanolamine or NaOH in aqueous solution. Several replicates were made for some of the plants, and in all cases control tests were made by sowing plants of the same species in untreated soil of the same composition. The soil in all of the boxes or pots was kept reasonably moist during the test-period.

The results of these experiments were graded visually according to the following arbitrary scale:

+++ full germination
++ inferior germination
+ poor germination
(+) few specimens germinate and soon perish
− no germination A summary of the results obtained in a large series of tests as described hereabove is shown in Table 2 below. This table shows the result after treatment of the soil with various amounts of the compounds in question, said amounts calculated as kgs. of active component per hectare. Most of the experiments were carried out with 2-amino-5-chlorobenzenesulphonamide (5-chloro-orthanilamide), formulated as a salt. Practically identical results are obtained with 5-bromo-orthanilamide.

*Table 2*

| Species of weed | Kgs. active component per hectare ||||
|---|---|---|---|---|
| | 0 | 2 | 6 | 18 |
| *Avena fatua* L. | +++ | +++ | + | − |
| *Poa trivialis* L. | +++ | + | (+) | − |
| *Lolium perenne* L. | +++ | + | (+) | − |
| *Rumex crispus* L. | +++ | ++ | (+) | − |
| *Chenopodium album* L. | +++ | ++ | + | (+) |
| *Agrostemma githago* L. | +++ | ++ | (+) | − |
| *Geranium sp* | +++ | ++ | (+) | (+) |
| *Daucus carota* L. | +++ | ++ | (+) | − |
| *Plantago major* L. | +++ | ++ | (+) | − |
| *Galinsoga parviflora* Cav. | +++ | ++ | + | − |
| *Senecio vulgaris* L. | +++ | ++ | + | − |

Table 2 covers a wide range of the plant system and shows that the compounds are equally effective against dicotyledonous and monocotyledonous plants, including various species of grass. This clearly distinguishes the present compounds from most known selective herbicides. It should also be noticed that the plants included in table 2 are important and harmful species of weeds, the 5-halogen-orthanilamides thus being effective in controlling those and other species of weeds at their earliest growth stage.

Also field trials have been carried out. Areas of each 10 m.$^2$ were used for the comparative experiments. On April 8, 1960, the areas were sprayed with 8 litres of solution in various concentrations of 5-bromo-orthanilamide, the liquid also containing Tween 80 as a dispersing agent. A known type of spraying apparatus was employed and a number of areas remained untreated. The concentrations of the orthanilamide corresponded to 2, 6, 18, and 54 kgs. per hectar, respectively. The day-temperature when spraying was 4–6° C., during the following days a considerable amount of rain was falling. The results were assessed on June 15–17. Three areas of each 0.1 m.$^2$ were selected in each field of 10 m.$^2$, the said areas being situated in the diagonal, and the number of specimens of annual weeds of all species in each area of 0.1 m.$^2$ was counted. As control, similar areas in untreated fields situated near the treated fields were employed. On this basis, the percentage of germination in the treated fields is calculated as $$100 \frac{a}{b}$$

and consequently the "inhibition percentage" as $$100 - 100 \frac{a}{b}$$

wherein $a$ denotes the number of specimens of annuals in the treated areas and $b$ denotes the number of specimens of annuals germinated in the untreated areas.

The results will appear from Table 3 below.

*Table 3*

| Amount of 5-bromo-orthanilamide, kgs./ha | 2 | 6 | 18 | 54 |
|---|---|---|---|---|
| Percent inhibition | 0 | 30 | 95 | 100 |

Thus it will be seen that under circumstances prevailing in practical horticulture or agriculture, these compounds are able to practically completely prevent annual weeds of all species from germinating when employed in suitable dosages. Since an inhibition of some 90% will be satisfactory for nearly all purposes, it can be deducted from Table 3 that an amount of from 15 to 20 kgs. per hectare will be a suitable amount in most cases though varying climatic and edaphic factors of course may alter these limits somewhat.

It is, however, a condition that comparatively large amounts of water are applied to the soil simultaneously with the treatment with the compounds in question, or soon after. This has been revealed by other experiments in which the compounds were applied to the soil in a dry period without subsequent watering; in such cases, no appreciable effect was observed.

Several useful plants and weeds in good growth have been treated with the 5-halogen-orthanilamides in order to assess their phytotoxicity against such plants. Only in one instance any harmful effect has been observed, viz., on onions of the Zittauer type; the growth of these is clearly hampered by treatment with the present compounds in amounts of about 20 kgs./ha.

The 5-halogen-orthanilamides maintain in the soil their inhibiting effect on the germination process for at least 4 to 5 months.

The physiological mode of action of the 5-halogen-orthanilamides is not really known. It seems as if they act only during or immediately subsequent to the germination of the seeds and that they act somewhat like anti-metabolites during the germination.

From the above it will be understood that, in order to inhibit or strongly hamper the germination of seeds present in the soil, the soil may be treated with suitable formulations of the compounds of the above general formula. Spraying of grown-up plants or even of young and juvenile specimens having passed the first seedling stage with the compounds in question has been found to have no effect on them, at least no appreciable effect, neither on parts above ground nor on subterranean parts. These compounds are non-toxic to animals in the concentration to be reasonably employed for agricultural or horticultural purposes. From this it will be understood that the compounds may be applied to the soil already a very short time after the germination of the desired vegetation or in ordinary flower beds etc.

This is highly useful for the farmer and horticulturist because various weeds, including a number of annual and biennial species, are a serious problem in many useful perennial or annual plant cultures. In some cases, of course, the weeds may be controlled by known selective weedkillers, such as herbicides of the hormone type. In most cases, however, such herbicides are harmful to the desired vegetation and therefore cannot be employed; in particular, they cannot be employed at very young growth stages of the desired vegetation. Therefore, many crops and cultures in flower gardens, green-houses, beet fields etc. are still weeded manually or by suitable machinery although it would be desirable to treat them chemically. The compounds of the general Formula (I) constitute an agent well fit for such chemical treatment, f. inst., in beet fields, in most greenhouse cultures and in most annual and perennial flower beds, as well as in many nurseries.

As described, the 5-halogen-orthanilamides are usually employed in the form of salts thereof with amines or alkali metals. It has been found, however, that the said compounds may also be rendered water-soluble by the aid of rongalite, i.e., sodium-formaldehyde-sulfoxylate. When reacted with the said orthanilamides, this compound is bonded to the amino group in the 2-position of benzene ring, thus forming a compound not previously known. The new compound is readily soluble in water; when applied to the soil, the rongalite moiety is split off and then renders the orthanilamide capable of exerting the action described.

The compounds of the above Formula I may, f. inst., be applied to cultures of perennials in the early spring in order to prevent the germination of seeds of weeds present in the soil. In some cases it is necessary or desirable to repeat the treatment at regular intervals, partly because some species of weeds germinate irregularly, partly because fresh seeds are continually added to the soil due to the natural seed dispersal. In annual flower beds, the soil may be treated soon after the germination of the desired flowers. The same holds true for various annual crops such as lettuce or cucumber in or outside greenhouses. In such cultures one treatment will suffice in many cases.

It will be understood that various modifications of the method and the composition may be performed by those skilled in the art. Such modifications are also intended to fall inside the scope of the invention and the accompanying claims.

I claim:

1. A method for inhibiting the germination of seeds of plants in soil, comprising applying to the seed-containing soil a water-soluble salt of 5-halogen-orthanilamide, in an amount of from 5 to 50 kgs. per hectare, calculated as halogen-orthanilamide.

2. A method as claimed in claim 1, wherein the water-soluble salt of the orthanilamide is an amine salt.

3. A method as claimed in claim 1, wherein the water-soluble salt is the triethanolamine salt.

4. A method as claimed in claim 1, wherein the water-soluble salt of the orthanilamide is an alkali metal salt.

5. A method for inhibiting the germination of seeds of plants in soil, comprising applying to the seed-containing soil a water-soluble salt of 5-halogen-orthanilamide, said salt being applied to the soil during rain in amounts of from 5 to 50 kgs. per hectare, calculated as 5-halogen-orthanilamide.

6. A method for inhibiting the germination of seeds of plants in soil, comprising treating the seed-containing soil with a water-soluble derivative of 5-halogen-orthanilamide in amounts of from 5 to 50 kgs. per hectare, calculated as 5-halogen-orthanilamide, and subsequently watering strongly the soil thus treated.

7. A method for inhibiting the germination of seeds of plants in soil, comprising applying to the seed-containing soil a water-soluble salt of 5-halogen-orthanilamide, said salt being applied to the soil during rain in amounts of from 15 to 20 kgs. per hectare, calculated as 5-halogen-orthanilamide.

8. A method for inhibiting the germination of seeds of plants in soil, comprising applying to the seed-containing soil a water-soluble derivative of 5-halogen-orthanilamide in amounts of 15 to 20 kgs. per hectare, calculated as 5-halogen-orthanilamide, and thereafter strongly watering the soil thus treated.

9. A composition for inhibiting the germination of seeds of plants, and containing, as an active component, an effective concentration of a water soluble salt of 5-halogen-orthanilamide having the formula

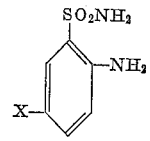

wherein X designates a halogen atom, and a diluent.

10. A composition as in claim 9; wherein said water soluble salt is an amine salt.

11. A composition as in claim 9; wherein said water soluble salt is an alkali metal salt.

12. A composition as in claim 9; wherein said diluent is water.

13. A composition as in claim 9; wherein said diluent is a solid pulverulent material.

14. A composition as in claim 9; wherein said halogen atom is selected from the group consisting of chlorine and bromine.

References Cited in the file of this patent

FOREIGN PATENTS 1,091,419    Germany _____ Oct. 20, 1960

OTHER REFERENCES

Thompson et al. in "Botanical Gazette," vol. 107, 1946, pages 475–507, 71–2.6.

Parke et al. in "J. Chem. Soc.," 1950, pages 1757–1760.

Fromme et al. in "Chemical Abstracts," vol. 46, 1952, col. 8315g, 71–2.3.